(12) United States Patent
Matan

(10) Patent No.: US 8,013,583 B2
(45) Date of Patent: Sep. 6, 2011

(54) DYNAMIC SWITCH POWER CONVERTER

(75) Inventor: Stefan Matan, Navato, CA (US)

(73) Assignee: XSLENT Energy Technologies, LLC, Novato, CA (US)

( * ) Notice: Subject to any disclaimer, the term of this patent is extended or adjusted under 35 U.S.C. 154(b) by 398 days.

(21) Appl. No.: 11/535,453

(22) Filed: Sep. 26, 2006

(65) Prior Publication Data

US 2007/0273351 A1   Nov. 29, 2007

Related U.S. Application Data

(63) Continuation-in-part of application No. 10/884,127, filed on Jul. 1, 2004, now abandoned.

(60) Provisional application No. 60/720,403, filed on Sep. 26, 2005.

(51) Int. Cl.
G05F 1/00 (2006.01)

(52) U.S. Cl. ............... 323/282; 323/271; 363/15

(58) Field of Classification Search .......... 363/15, 363/16, 20, 21.01, 59, 60, 906; 323/282–284, 323/906, 271–274; 320/101, 140
See application file for complete search history.

(56) References Cited

U.S. PATENT DOCUMENTS

| | | | | |
|---|---|---|---|---|
| 3,859,562 A | * | 1/1975 | Nakamura | 315/241 P |
| 3,860,863 A | * | 1/1975 | Lamprecht | 250/214 SG |
| 4,341,607 A | * | 7/1982 | Tison | 205/343 |
| 4,390,940 A | * | 6/1983 | Corbefin et al. | 363/132 |
| 5,512,145 A | * | 4/1996 | Hollenberg | 205/628 |
| 5,515,261 A | * | 5/1996 | Bogdan | 363/89 |
| 5,648,731 A | * | 7/1997 | Decker et al. | 324/767 |
| 5,923,158 A | * | 7/1999 | Kurokami et al. | 323/299 |
| 5,973,491 A | * | 10/1999 | Onizuka et al. | 363/124 |
| 6,057,665 A | * | 5/2000 | Herniter et al. | 320/101 |
| 6,175,512 B1 | * | 1/2001 | Hagihara et al. | 363/71 |
| 6,311,137 B1 | * | 10/2001 | Kurokami et al. | 702/60 |
| 6,320,769 B2 | * | 11/2001 | Kurokami et al. | 363/56.03 |
| 6,351,400 B1 | * | 2/2002 | Lumsden | 363/95 |

(Continued)

FOREIGN PATENT DOCUMENTS

WO   WO 2004054076 A1   *   6/2004

(Continued)

OTHER PUBLICATIONS

Machine translation of WO2004054076.*

(Continued)

*Primary Examiner* — Adolf Berhane
*Assistant Examiner* — Emily Pham
(74) *Attorney, Agent, or Firm* — Blakely, Sokoloff, Taylor & Zafman, LLP

(57) ABSTRACT

The present invention provides a dynamic switch power conversion circuit to improve the efficiency of a solar cell array, and specifically to operate the solar cell array under various sunlight intensities, especially under low light conditions. In an embodiment of the invention, the dynamic switch power conversion circuit comprises: a processor to continuously monitor the power output of a solar panel under varying sunlight conditions, and a switching converter circuit comprising a plurality of circuit operations for different optimum power conversion. The processor gathers the output power from the solar panel and then uses predetermined power curves related to maximum generated power versus sunlight conditions of that particular solar panel to switch the switching converter circuit to a circuit operation particular suited to that sunlight condition to achieve the maximum power generated from the solar panel.

15 Claims, 13 Drawing Sheets

U.S. PATENT DOCUMENTS

| | | | |
|---|---|---|---|
| 6,448,489 B2 | 9/2002 | Kimura et al. | |
| 6,657,419 B2 * | 12/2003 | Renyolds | 323/285 |
| 7,449,866 B2 * | 11/2008 | Kanai et al. | 323/222 |
| 2003/0080696 A1 * | 5/2003 | Tang et al. | 315/291 |
| 2004/0090806 A1 * | 5/2004 | Yoshida et al. | 363/60 |
| 2004/0257842 A1 * | 12/2004 | Hui et al. | 363/97 |
| 2005/0105224 A1 * | 5/2005 | Nishi | 361/18 |
| 2007/0221267 A1 | 9/2007 | Fornage | |

FOREIGN PATENT DOCUMENTS

WO    WO-2009102842    8/2009

OTHER PUBLICATIONS

Non-Final Office Action mailed Oct. 26, 2009 (received Dec. 17, 2009) for Mexican Patent Application No. MX/a/2007/000231.

* cited by examiner

12W Flexible Solar Panel
Early Moring Indirect Sun

DYNAMIC SWITCH POWER CONVERTER

CROSS-REFERENCE TO RELATED APPLICATION

The present application is a continuation-in-part of U.S. patent application Ser. No. 10/884,127, entitled "Power Extractor Circuit," and filed Jul. 1, 2004 now abandoned, the disclosure of which is incorporated by reference herein in its entirety. The present application also claims priority under 35 U.S.C. §119(e) to U.S. Provisional Patent Application No. 60/720,403, entitled "Dynamic Switch Power Converter," and filed Sep. 26, 2005, the disclosure of which is also incorporated by reference herein in its entirety.

BACKGROUND OF THE INVENTION

1. Field of Invention

The present invention relates generally to electrical power systems and more particularly, to a dynamic switch power conversion circuit for capturing the maximum power generated by a solar panel under varying sunlight conditions.

2. Description of Related Art

Solar power is a clean and renewable source of energy that has mass market appeal. Among its many uses, solar power can be used to convert the energy from the sun either directly or indirectly into electricity. The photovoltaic cell is a device for converting sunlight energy directly into electricity. When photovoltaic cells are used in this manner they are typically referred to as solar cells. A solar cell array or module is simply a group of solar cells electrically connected and packaged together. One of the drawbacks of the utilization of solar cells are their relatively expensiveness due to the high cost of production and low energy efficiency, e.g., 3 to 28 percent.

Prior techniques have been employed to improve the efficiency of solar cells. One of the earliest improvements was the addition of a battery to a solar cell circuit to load level the electrical output from the circuit during times of increased or decreased solar intensity. In itself, a photovoltaic or solar array can supply electrical power directly to an electrical load. However, the major drawback of such a configuration is the diurnal variance of the solar intensity. For instance, during daylight operation, a solar cell produces excess power while during nighttime or periods of reduced sunlight there is little or no power supplied from the solar cell. In the simplest electrical load leveling scenario, the battery is charged by the solar cell during periods of excessive solar radiation, e.g., daylight, and the energy stored in the battery is then used to supply electrical power during nighttime periods.

A single solar cell normally produces a voltage and current much less than the typical requirement of an electrical load. For instance, a typical conventional solar cell provides between 0.2 and 1.4 Volts of electrical potential and 0.1 to 5 Amperes of current, depending on the type of solar cell and the ambient conditions under which it is operating, e.g., direct sunlight, cloudy/rainy conditions, etc. An electrical load typically requires anywhere between 5-48 V and 0.1-20 A. To overcome this mismatch of electrical source to load, a number of solar cells are arranged in series to provide the needed voltage requirement, and arranged in parallel to provide the needed current requirement. These arrangements are susceptible since if there is a weak or damaged cell in the solar cell array, the voltage or current will drop and the array will not function to specification. For example, it is normal to configure a solar cell array for a higher voltage of 17 V to provide the necessary 12 V to a battery. The additional 5 V provides a safety margin for the variation in solar cell manufacturing and/or solar cell operation, e.g., reduced sun light conditions.

Since the current produced by solar cell arrays is constant, in the best of lighting conditions, the solar cell array loses efficiency due to the fixed voltage of the battery. For example, a solar cell array rated for 75 Watts at 17 Volts will have a maximum current of 75/17=4.41 Amperes. During direct sunlight, the solar cell array will in reality produce 17 V and 4.41 A, but since the battery is rated at 12V, the power transferred will only be 12*4.41=52.94 Watts, for a power loss of about 30%. This is a significant power loss; however, it is not desirable to reduce the maximum possible voltage provided by the solar cell array because under reduced sunlight conditions, the current and voltage produced by the solar cell array will drop due to low electron generation, and thus might not able to charge the battery.

FIGS. 1(a)-(d) illustrate Current-Voltage (I-V) and power electrical behavior outputs of a conventional solar cell module under different sunlight intensities and conditions. The current in milliamperes (mA) and the power in milliwatts (mW) are plotted on the vertical y axes. The voltage in volts (V) is plotted on the horizontal x axis. These figures show the shortcomings of the prior art in providing electrical load leveling for a typical 12 V battery connected to a solar cell array for energy storage during the daylight hours of sunlight whether full sun or not.

Six different I-V curves are shown in FIG. 1(a). Three of the curves are for a crystalline solar cell and another three of the curves are for an amorphous silicon module. The solar intensity falling on the arrays are labeled as 50, 75, 100, and 200 Watts (W) per square-meter (W/m$^2$). The "Battery Charging Window" is illustrated by the two parallel slightly curved lines moving up from 11 and 14 volts on the x axis.

Also illustrated in this figure is the case where the lowest intensity I-V curves at 75 W/m$^2$ enter slightly or not at all the "Battery Charging Window," thereby resulting in little or no charging of the battery. This would be the case for heavily clouded or rainy days. Also shown is the result that some of the charging of the battery takes place to a lesser degree from the moderate intensity at 100 W/m$^2$ depending on the type of solar cell array. This would be the case for semi-cloudy days. Finally, the condition for a high intensity flooding of the solar cell array at 200 W/m$^2$ is shown. This would be the case for full sun days. In effect, FIG. 1(a) shows that the charging of a battery directly from solar cell arrays may not yield an optimum result depending on the type of solar cell array used and the conditions of the solar environment to which the solar cell array is exposed.

Industry standard crystalline solar cells are only effective at charging a 12 V battery at the highest intensity of 200 W/m$^2$. Also, the amorphous silicon module, which is one of the most efficient present day solar cell arrays, although providing more charging power to the battery at all but the lowest of intensities, still indicates a significant fall off in power due to a decrease in current from the highest to the lowest solar intensity. So even for the most efficient solar cell modules available today, optimum power is still not being delivered to the battery.

A Maximum Power Point Tracker (MPPT or "power tracker") is an electronic DC-to-DC converter that optimizes the match between the solar cell array and the battery. A MPPT can recover some of the power loss, provided that the power consumed by the MPPT circuitry is not excessive. In the example of the solar cell array outputting 75 W at 25 V (3 A maximum) described above, the addition of a MPPT circuit reduces the voltage output of the solar cell array to 13 V. Assuming the power consumed by the MPPT is minimal, the DC-to-DC converter conserves the 75 W of output power, and thus the output of the DC-to-DC converter is 13 V, 5.77 A (from conservation of power 25 V×3 A=13 V×5.77 A). Accordingly, the current produced is higher with the MPPT than the maximum current of the solar cell array without the MPPT. The reason for the use of 13 V is to provide a positive one Volt difference between the output of the MPPT circuit and the battery. However, an MPPT circuit requires a minimum voltage and power to operate. For instance, the minimum input requirements of a typical MPPT circuit available on the market is 19 volts at 50 watts of power. Other MPPT circuits require higher input voltages and powers. Thus if the voltage drops below 19 volts the MPPT circuit does not operate.

The challenge with using solar cell devices is that the power generated by these devices varies significantly based on both the exposure to sunlight and the electrical load applied to the device. A maximum current can be achieved with a short circuited load, but under this condition, the output power generated by the solar cell device is zero. On the other hand, if the load has a maximum voltage, the current derived from the solar cell device drops to zero, and then again no power is generated. Therefore, in order to yield maximum power the output load has to be adjusted based on the exposure level of the solar cell array to sunlight.

The sunlight conditions are often controlling on the performance of a solar cell array. A few notable conditions are illustrated in FIGS. 1(b)-(d).

FIG. 1(b) shows the electrical behavior of a 12 W flexible solar panel array under the conditions of low sunlight exposure levels due to an early morning indirect sun or an open sun at high angles of incidence to the array. Designated by the left vertical axis is the solar array output power in milliwatts and designated on the right vertical axis is the solar array output current in milliamperes. The voltage output of the solar array is designated on the horizontal axis. As illustrated by the data plotted, the power and current outputs for this particular solar cell array cannot generate power to charge a 12V battery within the boundaries of the given lighting conditions. Power is available in excess of 10% of array capacity, but in order to make use of this power, a 12V battery cannot be used as in this example.

FIG. 1(c) shows the electrical behavior for the same 12 W flexible solar panel, but, in this case, under the conditions of increased sunlight illumination, but not full sunlight. It can be readily seen from this figure that the maximum power that may be obtained under these conditions is 8.65 W at 9.5 V, but it is commonly known that 13.5 V is necessary to charge a 12 V battery. At the required 12 V, the power available drops to 6 W, a reduction of 31% in the available power.

FIG. 1(d) shows the electrical behavior for the same flexible solar panel under exposure to full sun. In this case, the maximum output is 5.177 W at 16 V. However, the power available at 12 V is only 4.4 W. This is a reduction of 18% of the available power. The maximum voltage available is 16 V even though this flexible solar panel was originally designed for operation at 12 V.

With the exclusion of the highest sunlight intensities, the above examples show the deficiency of the prior art in matching the charging power requirements for a conventional 12 V battery. Accordingly, there is a need to efficiently capture the power of a solar cell during low power output due to, for example, reduced sunlight conditions.

SUMMARY OF THE INVENTION

The present invention overcomes these and other deficiencies of the prior art by providing a dynamic switch power conversion circuit to capture the maximum power generated by a photovoltaic device (i.e., solar cell array or panel) under varying sunlight conditions. Under reduced incident solar radiation, a solar cell array does not receive enough sunlight to produce adequate power to charge an energy storage battery or to power a typical electrical load.

Under reduced incident solar radiation, a solar cell array does not receive enough sunlight to produce adequate power to charge an energy storage battery or to power a typical electrical load. By utilizing switching topology, the present invention draws power from a photovoltaic device over a wider range of lighting conditions. A panel, which is designed to charge a 12 V battery, that is only generating 6 V due to subdued lighting, will still generate a considerable amount of energy. Though the amount of power generated may be small, but with this circuit, given enough time, even in these low-light conditions, the battery will reach full charge.

The present invention provides a circuit to improve the efficiency of a solar cell array, and specifically to operate the solar cell array under various sunlight intensities, especially under low light conditions. The present invention is also suitable for low quality solar cells and flexible solar cells, because even in the best sunlight conditions, many of these solar cells could still produce as much power as high quality, single crystal silicon solar cells under low light conditions.

The present invention employs a variable input converter circuit with the converter input changes to match the voltage output of the solar cells under different sunlight conditions to obtain the maximum power available to the solar panel to charge a battery or to power a load. The converter circuit is preferably a DC to DC converter, such as a voltage/current booster, a voltage/current reducer (buck), a Cuk converter, a any combination of voltage booster and buck. The circuit also comprises a processor to control the variable input, preferably the input voltage, based on the output power of the solar panel due to the sunlight condition.

In an embodiment of the invention, the dynamic switch power conversion circuit comprises: a processor to continuously monitor the power output of a solar panel under varying sunlight conditions, and a switching converter circuit comprising a plurality of circuit operations for different optimum power conversion. The processor gathers the output power from the solar panel and then uses predetermined power curves related to maximum generated power versus sunlight conditions of that particular solar panel to switch the switching converter circuit to a circuit operation particular suited to that sunlight condition to achieve the maximum power generated from the solar panel.

The power output that the processor monitors can be the output current and voltage directly measured from the solar panel output, or can be measured from the load, or from within the switching converter circuit. The switching converter circuit can be a variable DC-to-DC converter with a varying input DC voltage and an output DC voltage matching with the applied load. The multiple input DC voltages of the DC-to-DC converter form the multiple circuit operations with proper matching with the maximum power of the solar panel, and are controlled by the processor circuit.

An advantage of the present invention is that it employs predetermined power curves of the solar panel to simplify the operation of the switching converter circuit, thus providing a cost effective solution for maximize solar power utilization.

The foregoing, and other features and advantages of the invention, will be apparent from the following description of the invention, the current embodiments of the invention, the accompanying drawings, and the claims.

DESCRIPTION OF EMBODIMENTS

Figure 1A:
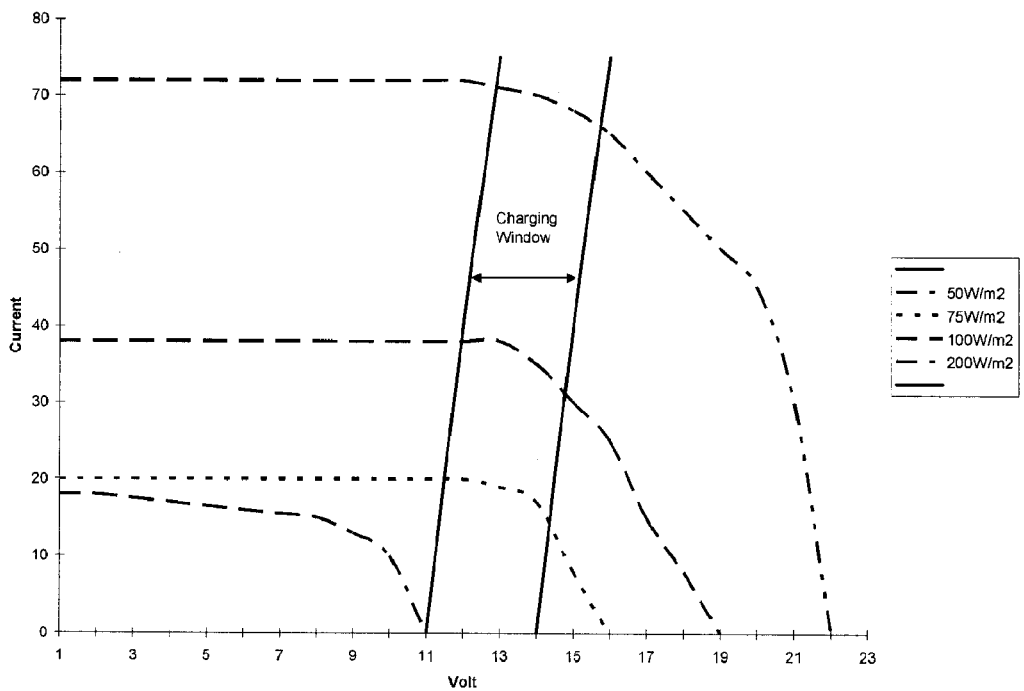
FIG. 1 illustrates Current-Voltage (I-V) and power behavior outputs of a conventional solar cell module charging a 12 volt battery under different sunlight intensities and conditions.
Figure 1B:
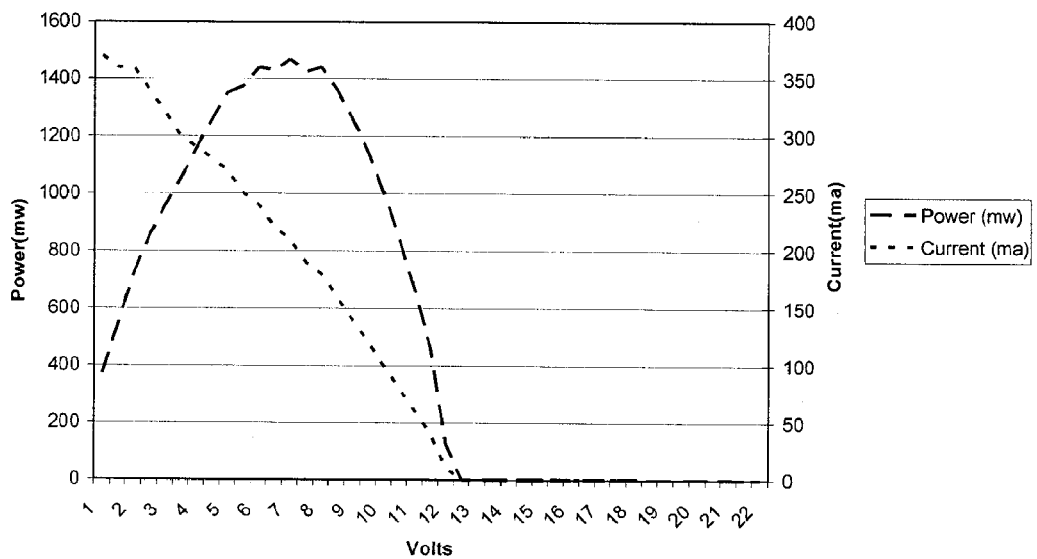
Figure 1C:
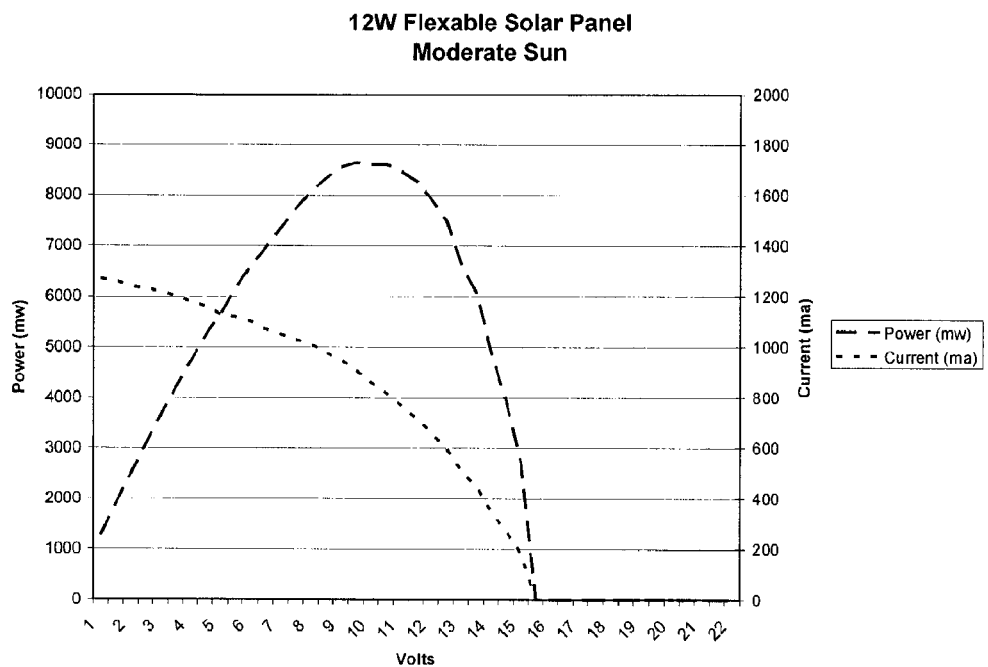
Figure 1D:
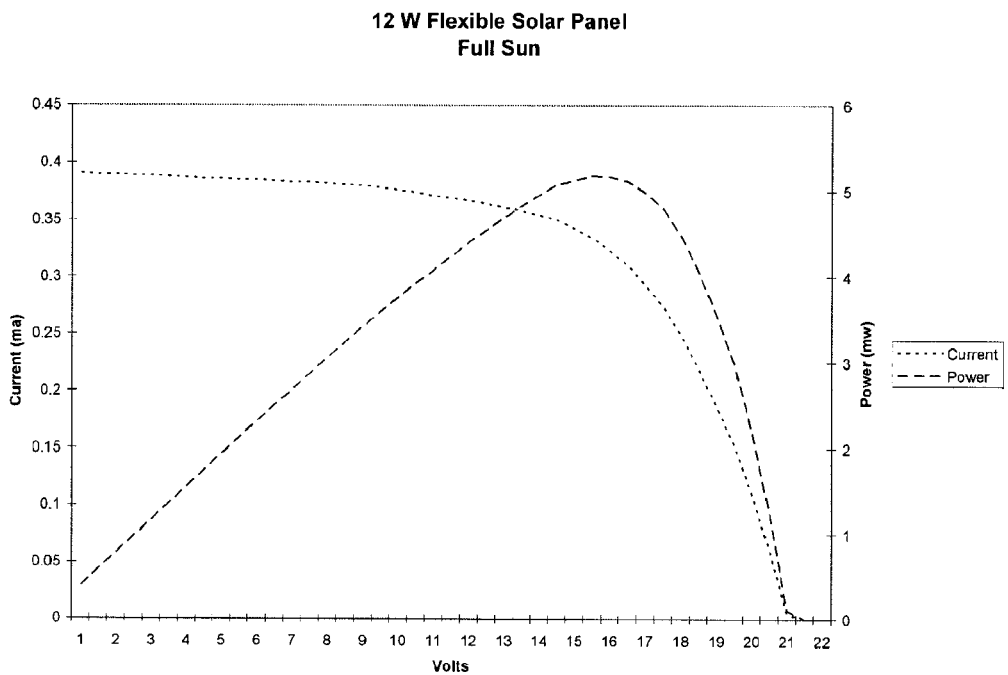

Further features and advantages of the invention, as well as the structure and operation of various embodiments of the invention, are described in detail below with reference to the accompanying FIGS. 2-10, wherein like reference numerals refer to like elements. The embodiments of the invention are described in the context of solar power and solar cells. Nonetheless, one of ordinary skill in the art readily recognizes that any photovoltaic device is encompassed by the embodiments of this invention as are other variable electrical power sources such as, but not limited to wind, geothermal, biomass, fuel cells and hydroelectric power sources.

Solar cell arrays are an excellent source of power since they can be operated anywhere under sunlight. However, improving the efficiency of the solar cell array is a major concern since solar cell arrays do not normally operate well under low light conditions. Specifically, since almost all solar cell arrays come with a rechargeable energy storage battery, the weather conditions that do not allow the solar cell array to produce adequate power to charge the battery render the array deficient.

Figure 2A:
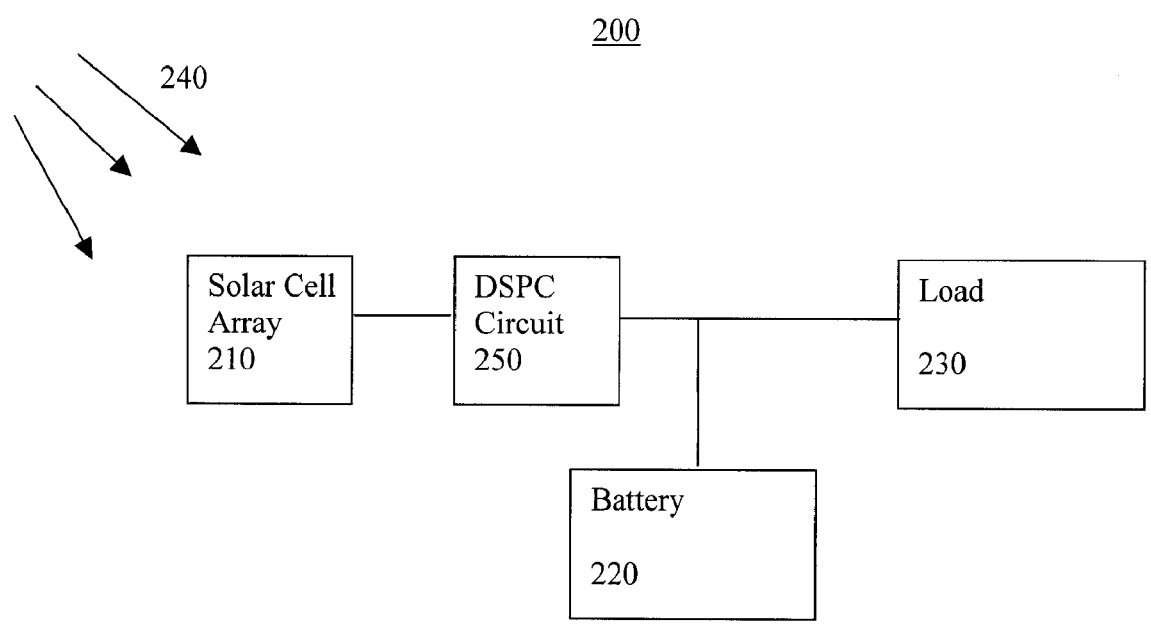
FIG. 2 illustrates a solar cell dynamic switch power supply system according to an embodiment of the invention.

FIG. 2 illustrates a dynamic switch power supply system 200 according to an embodiment of the invention. Referring to FIG. 2(a), the dynamic switch power supply system 200 comprises a solar cell array 210, a battery 220, an electrical load 230, and a dynamic switching power converter circuit (DSPC) 250. The battery 220 and the load 230 are designed for operation at a predetermined voltage, for example, 12 V, and do not operate at any lower voltage. Solar energy 240 is converted to electrical energy at the solar cell array 210. The solar cell array 210 is rated at a predetermined voltage, for example, 17 Volts, under direct full sunlight, so even under optimum sunlight illumination, the DSPC 250 employs a step-down DC to DC converter (not shown) for best efficiency. However, when the sunlight illumination 240 decreases, for example, under cloudy and/or rainy weather conditions, the solar cell array 210 produces voltages of less than 12 Volts, for example, 10 Volts. Under this condition, the solar panel 210 may employ a step-up DC to DC converter of the circuit 250, and the load 230 is operated by the battery 220. Thus, the power generated by the solar panel from cloudy to full sun weather is at maximum power.

Figure 2B:
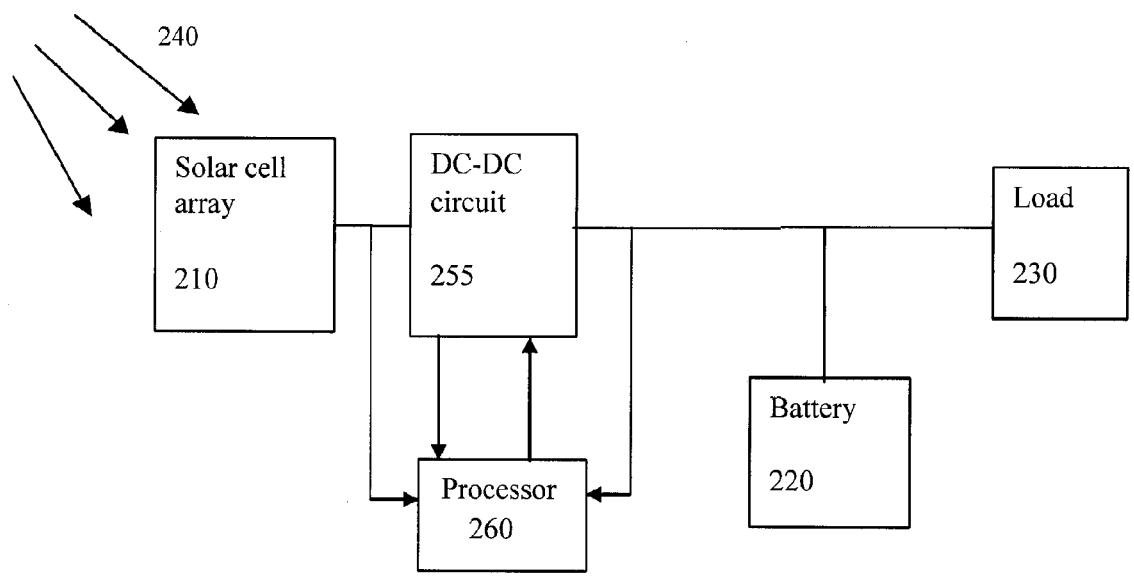

Referring to FIG. 2(b), further details of the dynamic switching power converter circuit 250 are illustrated wherein the DSPC 250 comprises a DC-DC circuit 255 and a processor 260. The processor 260 is electrically coupled to the DC-DC circuit 255. The DC to DC converter circuit 255 is disposed between the solar panel 210 and the battery 220 and the load 230. An input of the processor 260 is coupled either directly or indirectly to the output of the solar panel 210. The DC to DC converter circuit 255 has a variable DC input voltage, which is controlled from the processor 260. The DC to DC converter circuit 255 comprises a voltage booster and/or buck, and is designed to increase or decrease the output voltage of the solar panel to a voltage level of the maximum power from the solar panel. For example, suppose that the weather is cloudy and the solar panel 210 only produces 5 V output of maximum power for a 12 V battery. Without the DC to DC converter circuit 255, this solar panel 210 is not able to charge the 12V battery 220 or operate the load which requires voltage higher than 5 V. An arbitrary step-up voltage converter would provide the charging power, but would not be the most effective. Only a 5V input converter could harness the maximum power that the solar panel 210 can provide. In such a scenario, the processor 250 provides a signal to the DC to DC converter 255 to operate at this maximum power level.

Another characteristic of the DC to DC converter circuit 255 is its power requirement. Even though the DC to DC converter circuit 255 is connected to the solar panel 210 and the battery 220 and load 230 with all of these components rated at high power (12-17 V in the above example), the DC to DC converter circuit 255 is designed to operated at a much lower power, 4-5 V power supply or even lower in the above example. The DC to DC converter circuit 255 effectively operates when the power level of the solar panel 210 goes down as well, and not only when the solar panel is at its peak power. However, the DC to DC converter circuit 255 also needs to sustain the high power of the solar panel 210 at its peak. Therefore, for a solar panel rated at 17 V, to capture the power in the range of 4.5 V to 12 V, the DC to DC converter 255 circuit operates in the range of 4.5 to 18 V.

Figure 3:
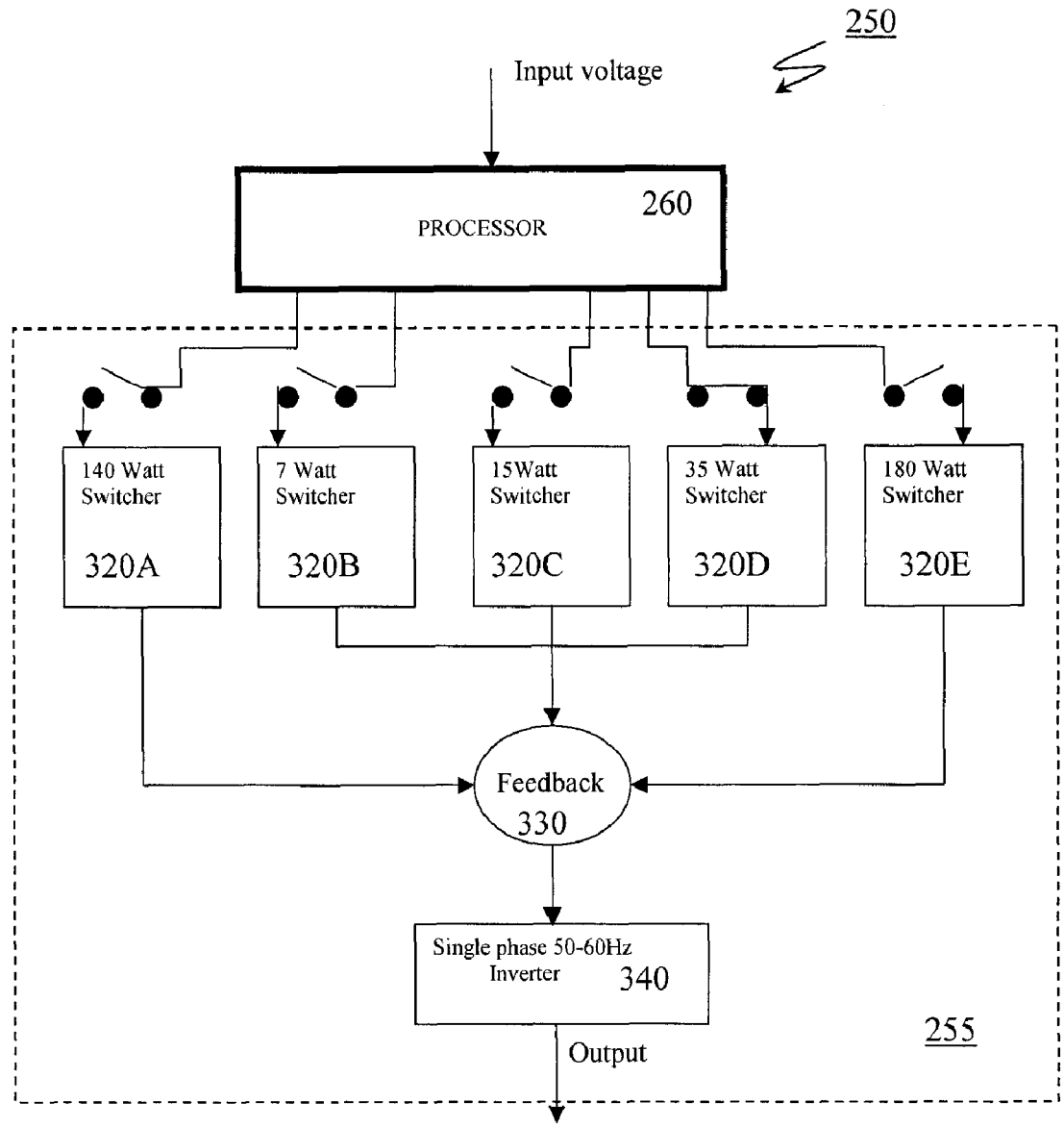
FIG. 3 illustrates the dynamic switching power converter circuit according to an embodiment of the invention.

FIG. 3 illustrates the dynamic switching power converter circuit 250 according to an embodiment of the invention. As noted above, the DSPC 250 comprises the processor 260 and the DC to DC converter circuit 255. The DC to DC converter circuit 255 comprises a plurality of switches 320A-E that are coupled to the processor 260, a feedback circuit 330, and a single phase inverter 340. The processor 260 is coupled to the solar cell array 210 and measures the power generated by the solar cell array 210 through a feedback circuit 330. The processor 260 also stores a number of pre-measured power curves, the identification and implementation of which are apparent to one of ordinary skill in the art, associated with the solar cell array 210. By comparing the measured power to pre-measured power curves, the processor 310 controls the opening and closing of the switches 320A-E to match the impedance of the DC to DC converter circuit 255 coupled to the solar panel 210 to the load 230, thereby delivering the maximum power available to the load 230.

In an embodiment of the invention, the switches 320A-E each comprise a metal-oxide-semiconductor field-effect transistor (MOSFET) with respective power rating and collectively serve as a transformer. The processor 260 calculates how much input power the solar panel will produce at any given time. During that process, the processor 260 chooses which switches 320A-E will open and close to match the impedance of the collective transformer as closely as possible, thereby resulting in 92-95% efficiency according to experimental results.

Solar panel 210 generally outputs a high current that would render the processor 260 and switches 320A-E inoperable. Accordingly, the processor 260 and DC to DC converter circuit 255 operate in the AC domain at an exemplary frequency of 20 kHz. By bumping the frequency to 20 kHz, the high current from the solar panel 210 is converted into a low current wherein the processor 260 can do the calculations and the switches 320A-E are able to operate. After all the calculations are completed the frequency is lowered and the current is increased through the inverter 340.

The above discussion focuses on a solar cell array power extraction technique, however it is readily apparent to one of ordinary skill in the art that the dynamic switching power converter circuit 250 can be applied to any electrical power supply, particularly a power supply with an electrical output that varies as a function of time. For example, in a hydroelectric power plant using flowing water to generate electricity through a turbine there are periods of reduced water flow that are not enough to match the existing electrical load. The dynamic switching power converter circuit 250 extracts and thereby, stores the hydroelectric power that otherwise would be lost. Yet another application is wind power which uses air flow to generate electricity. During the periods of low winds that are insufficient to charge the existing electrical load the dynamic switching power converter circuit 250 extracts and thereby, stores the wind power that otherwise might be lost.

In an embodiment of the invention, the dynamic switching power converter circuit 250 is coupled to the voltage output of one or more fuel cells. During sleeping mode periods, a fuel cell generates some, but too little power for the existing electrical load. The dynamic switching power converter circuit 250 extracts the power generated from fuel cells during the low power periods, which can then be stored in a battery.

Figure 4:
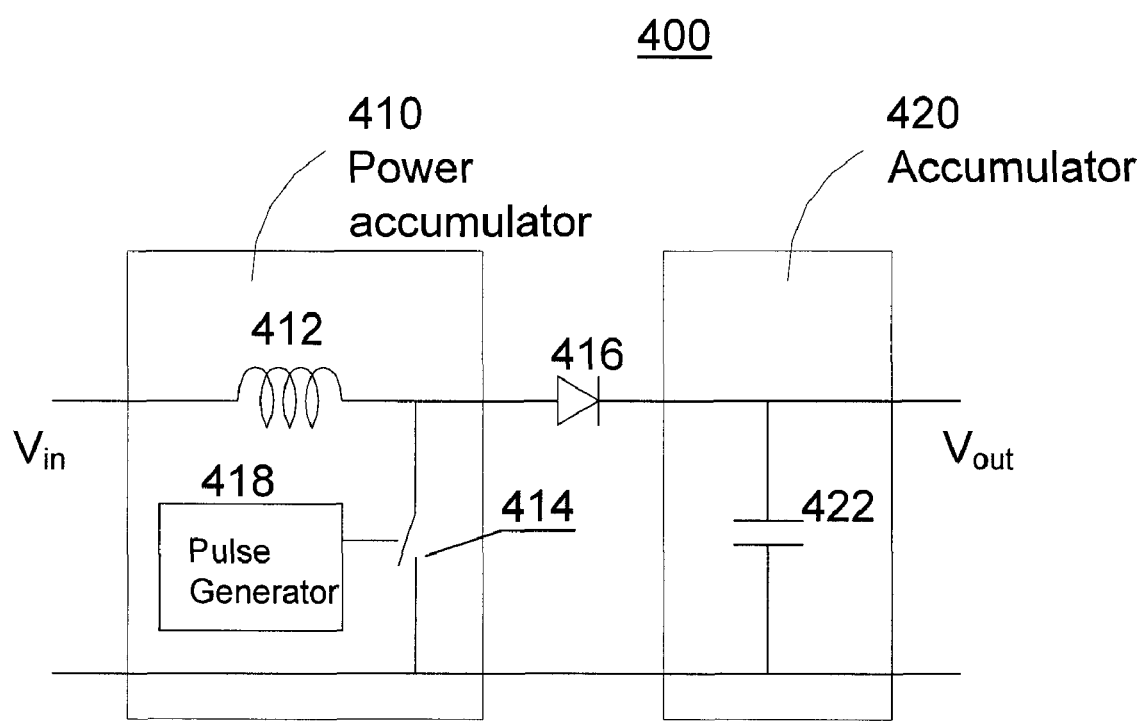
FIG. 4 illustrates an efficiency booster circuit according to an embodiment of the invention.

A conventional power extractor circuit 400 is shown in FIG. 4, which comprises a first power accumulator 410, a diode 416, and a second accumulator 420. The first power accumulator 410 comprises an inductor 412, a switch 414, and a pulse generator 418. The switch 414 is controlled by the pulse generator 418. The second accumulator 420 comprises a capacitor 422. If the switch 414 has been open for a relatively long time, the voltage across the capacitor 422 is equal to the input voltage. When the switch 414 closes (charge phase), the power is stored in the inductor 412 and the diode 416 prevents the capacitor 422 from being discharged. When the switch 414 opens (discharge phase), the charge stored in the inductor 412 is discharged to and accumulated in the capacitor 422. If the process of opening and closing the switch is repeated over and over, the voltage across the capacitor 422 will rise with each cycle.

Conventional DC-to-DC converters normally employ a feedback and control element to regulate the output voltage. However, the dynamic switching power converter circuit 250 does not require a feedback and control element. In an embodiment of the invention, the dynamic switching power converter circuit 250 comprises an inverted topology within the power extractor circuit 400 where the inductor 412 and the diode 416 are swapped. In another embodiment of the invention, the dynamic switching power converter circuit 250 comprises a boost transformer flyback topology yielding a boosted, inverted and isolated output voltage.

Figure 5:
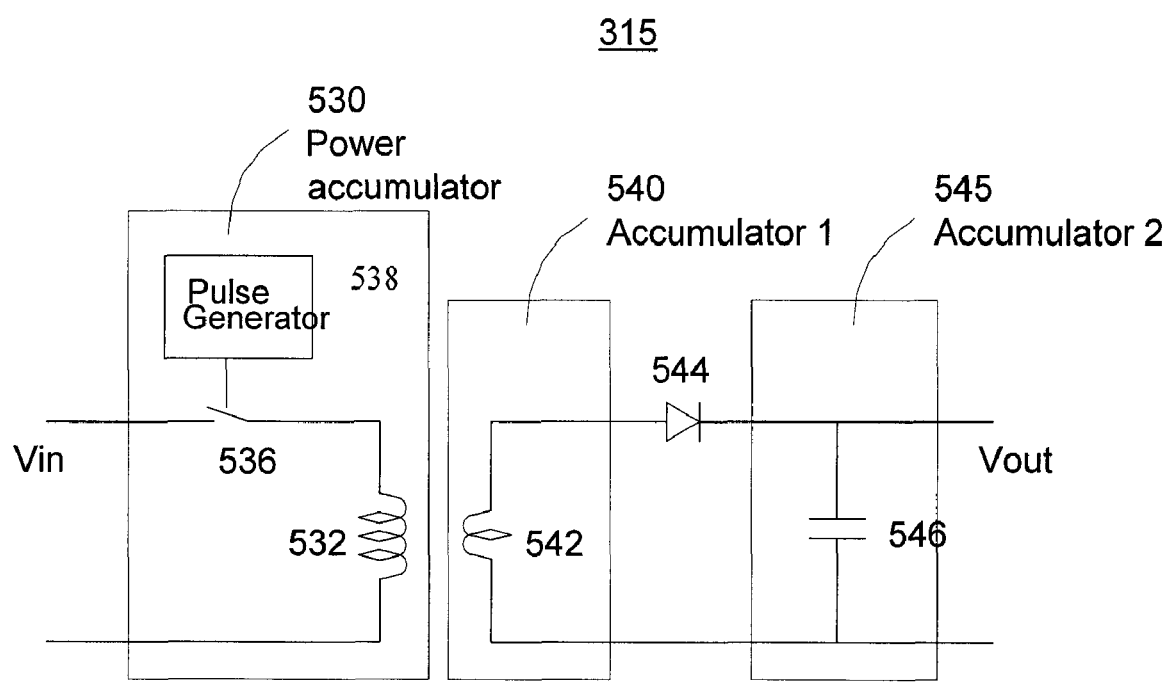
FIG. 5 illustrates a transformer flyback circuit according to an embodiment of the invention.

FIG. 5 illustrates a dynamic switching power converter circuit 250 implementing a boost transformer flyback topology according to an embodiment of the invention. Particularly, the dynamic switching power converter circuit 250 comprises a power accumulator 530, a first non-power accumulator 540, and a second non-power accumulator 545. The power accumulator 530 comprises a primary coil 532 of the transformer 534 and a switch 536 controlled by a pulse generator 538. The first non-power accumulator 540 comprises a secondary coil 542 of the transformer 534. The second non-power accumulator 545 comprises a capacitor 546. The diode 544 has the same function as described in FIG. 4 during the charge and discharge phases. In this transformer flyback topology, the primary coil of the transformer 532 is the inductor of the power accumulator 530. The capacitor 546 or the secondary coil of the transformer 542 each serve as accumulators. By using a high ratio of primary coil 532 to secondary coil 542 of the transformer, the dynamic switching power converter circuit 250 boosts the current level supplied to the second 540 and third 545 accumulators, e.g., the secondary coil 542 or an extra capacitor 546 in parallel with the secondary coil 542. In an embodiment of the invention, the switch 536 in the power accumulator 530 comprises a transistor connected across the source and drain (or emitter/collector) with the gate (or base) controlled by the pulse signal generator 530.

Figure 6:
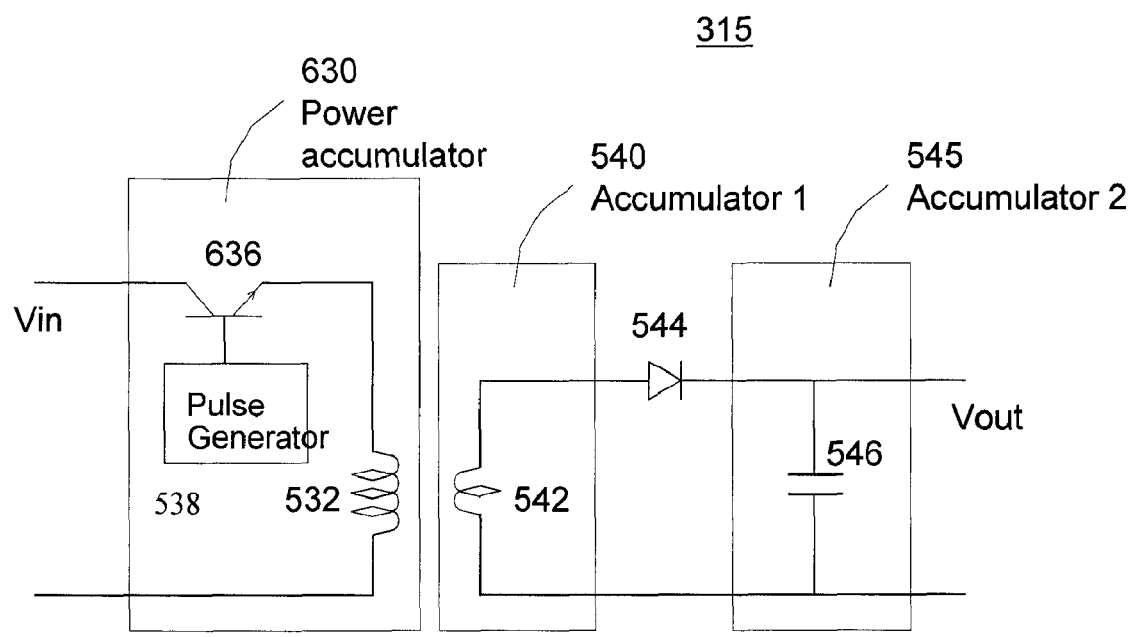
FIG. 6 illustrates a dynamic switching power converter circuit according to another embodiment of the invention.

FIG. 6 illustrates the dynamic switching power converter circuit 250 according to another embodiment of the invention. Here, the dynamic switching power converter circuit 250 comprises a power accumulator 630, the first non-power accumulator 540, the second non-power accumulator 545, and the diode 544. The power accumulator 630 comprises the primary coil 532 of the transformer and a transistor switch 636 controlled by the pulse generator 538. The power accumulator operates in conjunction with either the accumulator 540, which comprises the secondary coil 542 of the transformer or the accumulator 545, which comprises the capacitor 546, or both accumulators 540 and 545. Popular control techniques include pulse-frequency modulation, where the switch 636 is cycled at a 50% duty cycle; current-limited pulse-frequency modulation, where the charge cycle terminates when a predetermined peak inductor current is reached, and pulse-width modulation, where the switch frequency is constant and the duty cycle varies with the load.

Figure 7:
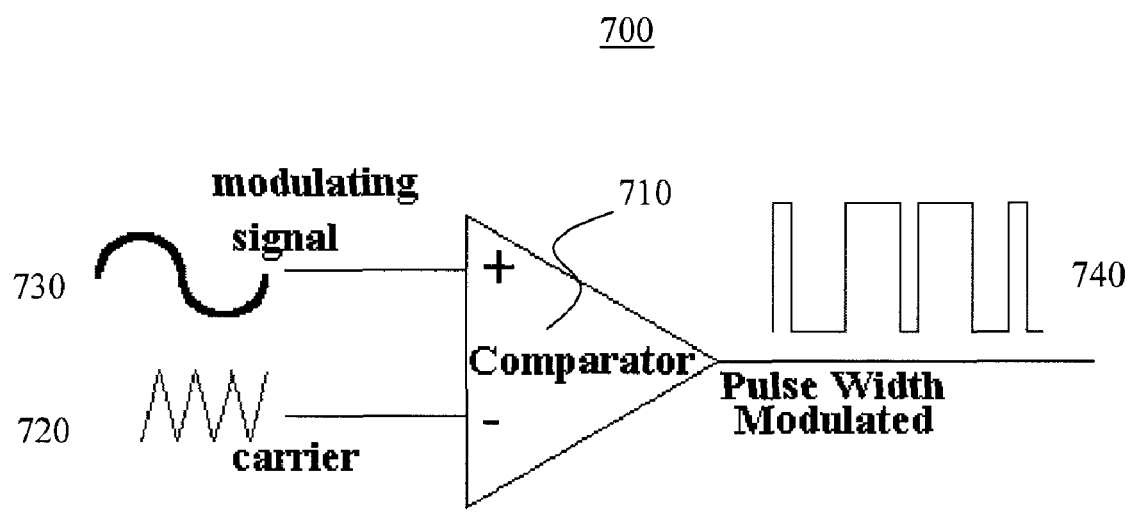
FIG. 7 illustrates a pulse width modulator according to an embodiment of the invention.

FIG. 7 illustrates a block diagram of a conventional pulse width modulation technique 700 employing a comparator 710 operating on a sawtooth carrier signal 720 and a sine modulating signal 730. The sawtooth carrier signal 720 and the sine modulating signal 730 are fed to the comparator 710 and the resulting output 740 is the pulse width modulated signal. The output signal of the comparator goes high when the sine wave signal is higher than the sawtooth signal.

Figure 8A:
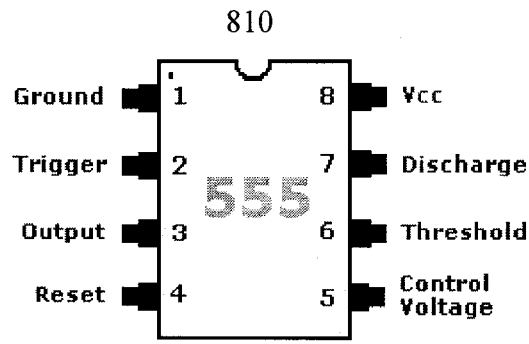
FIG. 8 illustrates the pin out of a 555 timer chip and an exemplary circuit of a 555 timer circuit for monostable operation according to an embodiment of the invention.
Figure 8B:
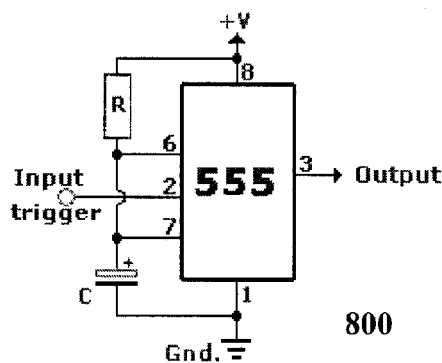
Figure 8B:
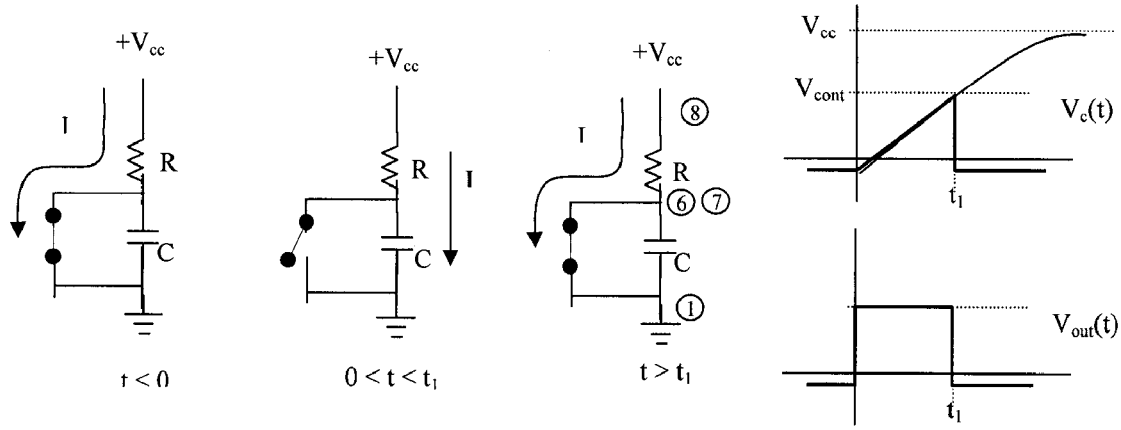

In an embodiment of the invention, the pulse generator 538 comprises a timing circuit 800 as illustrated in FIG. 8(a)-(b). The timing circuit 800 comprises a timer chip 810 such as, but not limited to a 555 timer chip, the implementation of which is apparent to one of ordinary skill in the art. The timing calculations for the 555 timer are based on the response of a series resister (R) and a capacitor (C) circuit ("R-C circuit") with a step or constant voltage input and an exponential output taken across the capacitor. The two basic modes of operation of the 555 timer are: (1) monostable operation in which the timer wakes up generates a single pulse then goes back to sleep and (2) a stable operation, in which the timer is trapped in an endless cycle—generates a pulse, sleeps, generates a pulse, sleeps, . . . on and on forever.

Referring to the circuits shown in FIG. 8(b) which are schematics of a 555 timer chip with the resistor and capacitor in monostable (one-pulse) operation, which can be understood with varying input $V_{trigger}$ and $V_{cc}$ parameters and the resulting $V_{output}$ for the following events in sequence. The lower case "t" designates time in these drawings. For the case where t<0, a closed switch keeps the capacitor uncharged with a resulting voltage on the capacitor of $V_c$=0 and output voltage $V_{out}$ of low value. For the case where t=0, a triggering event occurs and $V_{trigger}$ very briefly drops below $V_{control}/2$ very. This causes the switch to open. For the case where (0<t<$t_1$), $V_c$(t) rises exponentially toward $V_{cc}$ with time constant RC. $V_{out}$ is high for this case. For the case where (t=$t_1$), $V_c$ reaches $V_{control}$. This causes the switch to close which instantly discharges the capacitor. For the case where (t>$t_1$) a closed switch keeps the capacitor uncharged and $V_c$=0 and $V_{out}$ of low value.

Figure 9A:
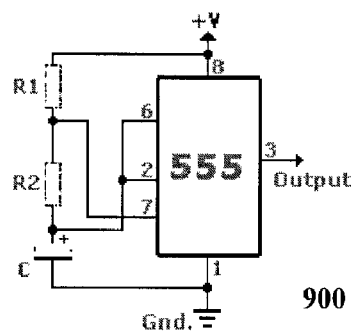
FIG. 9 illustrates a circuit to enact stable operation according to an embodiment of the invention.
Figure 9B:
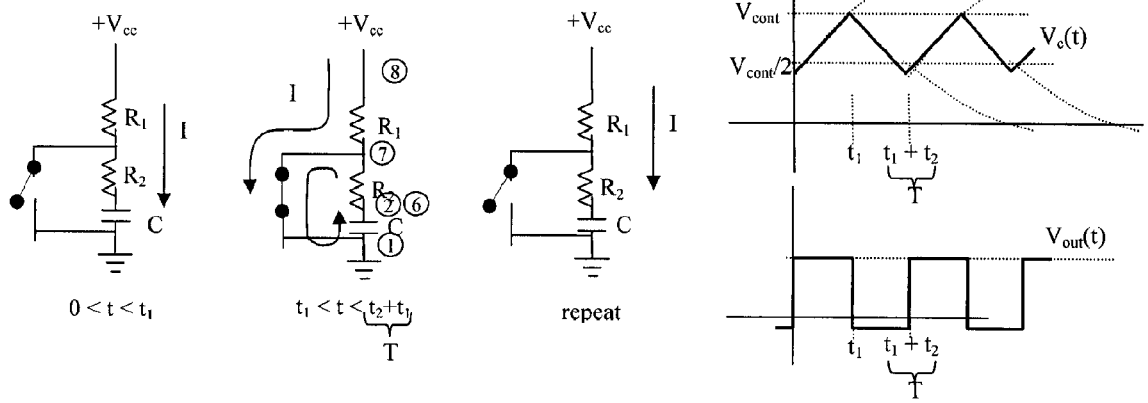

FIG. 9(a)-(b) illustrate the stable (pulse train) operation of timing circuit 900, which can be understood as consisting of the following events starting at a point where $V_c$=$V_{control}/2$. As shown in FIG. 9(b), in the case where t=0, $V_c$=$V_{control}/2$, and the switch opens. For the case where 0<t<$t_1$, $V_c$(t) rises exponentially toward $V_{cc}$ with time constant ($R_1$+$R_2$)C. $V_{out}$ is of a high value. For the case where t=$t_1$, $V_c$ reaches $V_{control}$. This causes the switch 860 to close. For the specific case where ($t_1$<t<$t_1$+$t_2$), $V_c$(t) falls exponentially toward zero with time constant $R_2$C. $V_{out}$ is at a low value. For the case where t=$t_1$+$t_2$=T, $V_c$ reaches $V_{control}/2$. This causes the switch to open. These conditions are the same as in step 1, so the cycle repeats every T seconds.

Figure 10:
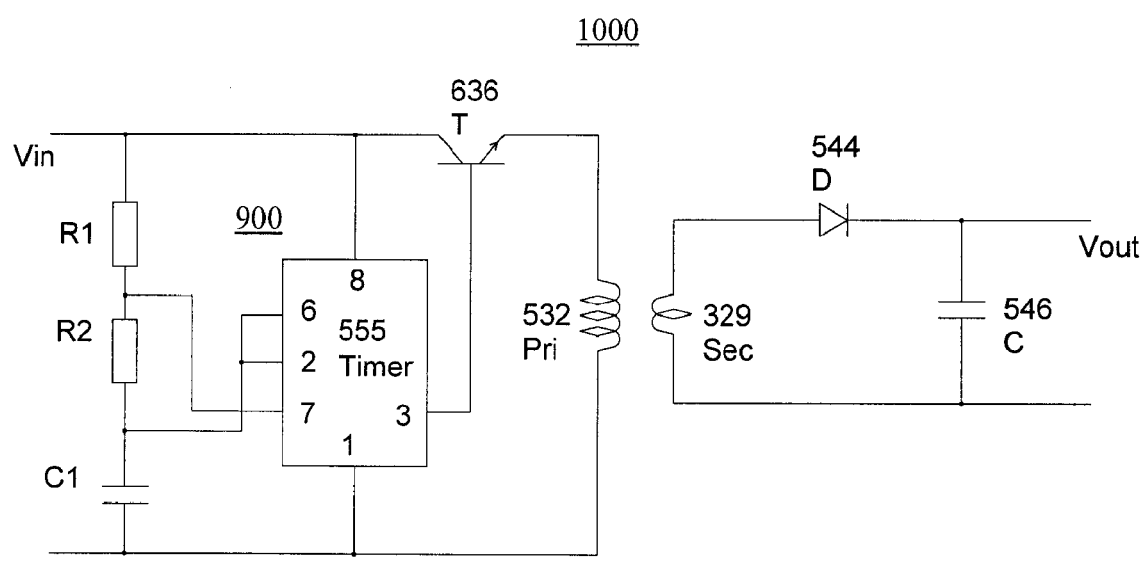
FIG. 10 illustrates a dynamic switching power converter circuit using a 555 timer circuit according to an embodiment of the invention.

An efficiency booster circuit 1000 according to another embodiment of the present invention is shown in FIG. 10, which uses the 555 timer circuit 900 described in FIG. 9. The circuit 1000 uses a transformer flyback topology to isolate the output voltage. It can also provide higher current to charge the capacitor 1020. The 555 timer 900 is particular suitable for a selected 17 V solar cell array, since the voltage rating of the 555 timer 900 is between 4.5 V and 18 V. Thus this embodiment can be operated for incident solar radiation supplied from a solar cell array with a voltage down to 4.5 V, thereby providing power beyond the range of a standard solar panel.

For further operation down to output voltages of 0.3 V of the solar cell array, an oscillator that operates at lower voltage is included according to an embodiment of the invention. A ring oscillator that is limited in operation below 0.4 or 0.5 V (see U.S. Pat. No. 5,936,477 to Wattenhofer et al., the disclosure of which is herein incorporated by reference in its entirety) provides a voltage boost.

Figure 11:
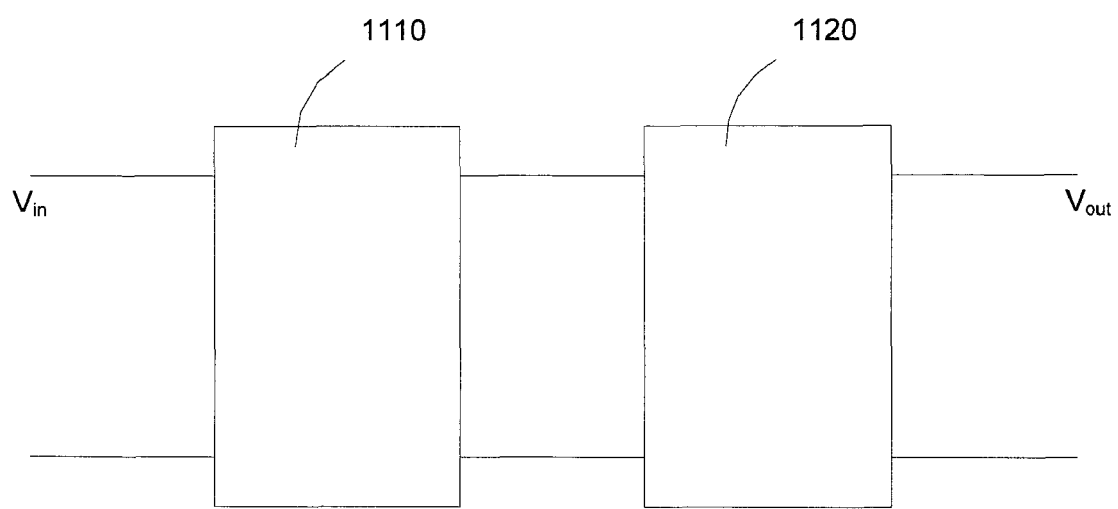
FIG. 11 illustrates multiple cascading dynamic switching power converter circuits according to an embodiment of the invention.

FIG. 11 illustrates a cascading system 1100 comprising multiple dynamic switching power converter circuits according to an embodiment of the invention. Particularly, a first dynamic switching power converter circuit 1110 and a second dynamic switching power converter circuit 1120 are connected in series to cover the voltage range needed. Cascading and a circuit breaker might be further needed to ensure proper operation. Although only two dynamic switching power converter circuit circuits are shown, one of ordinary skill in the art recognizes that three or more dynamic switching power converter circuits may be connected together in series.

In another embodiment of the invention, further components of a solar power can be included, for example a battery charger that uses a pulse-width-modulation (PWM) controller and a direct current (DC) load control and battery protection circuit and an inverter for generating AC voltages to operate conventional equipment, the implementation of all of which are apparent to one of ordinary skill in the art.

During use, the solar cell array can be spread open to increase their light receiving area for use in charging a battery pack, and it can be folded into a compact form to be stored when not in use. Since the solar cells are thin, the solar cell cube is relatively compact. The solar cells may be made larger by increasing the number of amorphous silicon solar cell units. A plurality of solar cells may also be connected electrically by cables or other connectors. In this fashion, solar cell output can easily be changed. Hence, even if the voltage or capacity requirement of a battery changes, the charging output can easily be revised to adapt to the new charging requirement. The charging technology of the present invention can also adjust the "Battery Charging Window" by utilizing techniques in power supply switching technology to move the charging window closer to the maximum efficiency point on the IV curve of the solar cell. The power generated is then used to either charge the reserve batteries or to offset the discharge time while the batteries are at full charge and under load.

The present invention is also particular suitable for low cost solar cells since these solar cells tend to produce less power and are not as efficient as the high cost ones. Flexible solar cell panels, as for example plastic panels, are low cost solar cells that can benefit from the present invention power extraction circuit.

The circuitry of the present invention can be tailored for each battery technology including nickel cadmium (Ni—CD) batteries, lithium ion batteries, lead acid batteries, among others. For example, Ni—CD batteries need to be discharged before charging occurs.

Other embodiments and uses of the invention will be apparent to those skilled in the art from consideration of the specification and practice of the invention disclosed herein. It will be understood by those skilled in the art that various changes in form and details may be made therein without departing from the spirit and scope of the invention as defined in the appended claims.

The invention claimed is:

1. A dynamic switch power converter circuit for improving power utilization of a variable direct current (DC) power source whose output varies as a function of time, the dynamic switch power converter circuit comprising a controller to detect an input power of the DC power source whose absolute power level varies as a function of time, generating higher voltage or lower voltage based on conditions of an environment in which the DC power source is located, the controller to generate a control signal based on the detected input power, and the controller to receive feedback from the DC power source, the controller to further include a memory to store precomputed power curves for the DC power source; and a variable input DC to DC converter to operate at one of multiple input voltages corresponding to the detected input power responsive to the controls signal, wherein the DC to DC converter includes a plurality of input switches, each configured for a different source input power, where the DC to DC converter selectively activates the switches based on the input DC voltage to most closely match the input power from the DC power source;

wherein the controller to adjust the DC to DC converter input voltage with the control signal based on the feedback received from the DC power source to more closely match the detected maximum power output of the DC power source based on selective activation of the switches, wherein the controller is to adjust the DC to DC converter input voltage based on the power curves.

2. A circuit as in claim 1, wherein the DC to DC converter comprises a voltage booster, a current booster circuit, or a combination of voltage booster and current booster circuit.

3. A circuit as in claim 1 wherein the DC to DC converter comprises a Cuk converter.

4. A circuit as in claim 1 wherein the DC to DC converter further includes
a pulse signal generator having a predetermined frequency supplied by an oscillator to control energy transfer from the switches to an output accumulator that delivers the DC to DC converter output.

5. A circuit as in claim 1 wherein the controller to receive the feedback comprises the controller to monitor the input power at the DC power source.

6. A circuit as in claim 1 wherein the controller to receive the feedback comprises the controller to monitor the current and voltage at the output of the DC power source.

7. A circuit as in claim 1 wherein the DC power source comprises a solar panel, and wherein the memory of the controller further comprises
a memory to store precomputed values of maximum power output of the solar panel for different sunlight conditions.

8. A circuit as in claim 1 wherein the DC power source comprises one of a solar panel, a hydroelectric power source, or a wind power source.

9. A dynamic switch power converter comprising:
a controller to detect an input power of a variable direct current (DC) power source, and generate a control signal based on the detected input power,
wherein input power from the DC power source varies as a function of time with higher or lower voltage levels based on environmental conditions of the DC power source, and
wherein the controller to receive feedback from the DC power source,
the controller to include a memory to store precomputed power curves for the DC power source; and
a variable input DC to DC converter to operate at one of multiple input voltages responsive to the control signal, wherein the DC to DC converter includes
power source feedback and output feedback, to input to the controller to adjust the control signal to adjust the input voltage of the DC to DC converter based on the input power and the output power,
a plurality of switches, each configured for a different source input power, where the DC to DC converter selectively activates the switches based on the input voltage to most closely match the input power from the DC power source, and
an output accumulator to deliver the DC to DC converter output to a load,
wherein the controller is to adjust which switches of the variable DC to DC converter are activated based on the power source feedback, and based on the power curves.

10. A power converter as in claim 9 wherein the DC power source comprises one of a solar panel, a hydroelectric power source, or a wind power source.

11. A power converter as in claim 9 wherein the DC to DC converter further includes
a pulse signal generator to control energy transfer from the switches to the output accumulator.

12. A power converter as in claim 9 wherein the output accumulator further comprises
a transformer to store energy received from the DC power source and transfer the stored energy to a load based on a control signal from the controller.

13. A power converter as in claim 12 wherein the output accumulator includes multiple accumulator stages,
one stage including the secondary windings of the transformer, and
another stage including an output capacitor.

14. A power converter as in claim 12 wherein the transformer has a high ratio of primary to secondary windings to boost current to the load.

15. A power converter as in claim 12 wherein the transformer boosts an output voltage at secondary windings of the transformer to match the load when the input voltage is lower than a voltage of the load.

* * * * *